May 15, 1945.  G. VALENSI  2,375,966
SYSTEM OF TELEVISION IN COLORS
Filed Jan. 14, 1939  5 Sheets-Sheet 1

Inventor:
Georges Valensi
By Brown-Neward
Attorneys

May 15, 1945.  G. VALENSI  2,375,966

SYSTEM OF TELEVISION IN COLORS

Filed Jan. 14, 1939  5 Sheets-Sheet 2

Inventor:-
Georges Valensi
By Brown· Oxward
Attorneys

May 15, 1945.    G. VALENSI    2,375,966
SYSTEM OF TELEVISION IN COLORS
Filed Jan. 14, 1939    5 Sheets-Sheet 3

Inventor:-
Georges Valensi
By Brown, Deward
Attorneys

May 15, 1945.  G. VALENSI  2,375,966

SYSTEM OF TELEVISION IN COLORS

Filed Jan. 14, 1939  5 Sheets-Sheet 5

Inventor:-
Georges Valensi
By Brown — Seward
Attorneys

Patented May 15, 1945

2,375,966

UNITED STATES PATENT OFFICE 2,375,966

SYSTEM OF TELEVISION IN COLORS

Georges Valensi, Paris, France; vested in the Alien Property Custodian

Application January 14, 1939, Serial No. 251,004
In France January 17, 1938

15 Claims. (Cl. 178—5.2)

The object of my invention is to provide a color television system utilising a frequency bandwidth of only twice that used in present day television in black and white, and of equal definition, whereas the usual television systems (employing three channels which transmit respectively the brilliances of the three principal components of an elementary area of the object to be televised) require a frequency bandwidth equal to three times that used in present day television in black and white and of equal definition. In other words my invention permits either an economy in the cost of the metallic line, or a less congestion in the ether in case of a radio link, between the transmitting and receiving stations.

According to the present invention, apparatus for the transmission by television of pictures in color includes two channels, one of the said channels containing means for providing a first signal T the value of which is dependent upon the color predominating in an elementary area of the picture scanned at a given instant, and the other of said channels containing means which provide a second signal t the value of which is dependent upon the mean brilliance of said elementary area. The value of the first mentioned signal T may be made dependent upon the color radiation which it is necessary mainly to suppress in the visible spectrum in order that the predominating color may remain; and again further means may be provided to render the value of the first mentioned signal also dependent upon the degree of saturation of the predominating color.

The use of two channels, one transmitting the predominating color (signal T), and the other the mean brilliance (signal t) enables the output from a single television transmitter to be received not only by color television receivers provided with the necessary more expensive equipment, but also by the ordinary type of television receiver which is more numerous and less expensive and which reproduces the pictures in black and white only. This is a further practical advantage of my invention.

Figure 1:
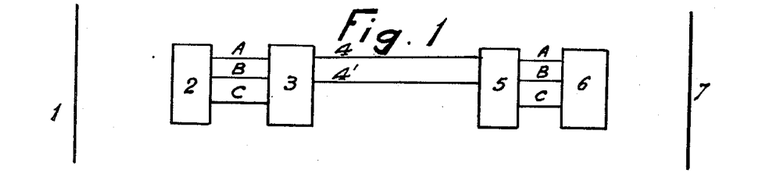

The principle of my invention is illustrated in Figure 1, where 1 is the object or scene to be shown at distance; 2 is a scanning device producing for each point of the object 1, three elements or magnitudes A, B, C, characterising the means brightness and the actual color of said point; 3 is a coding device which combines the three elements A, B, C in two electric signals T and t transmitted to the distant station over two channels 4, 4' of the metallic line or radiolink.

There the decoding device 5 restores the characteristic elements A, B, C which act on the television receiver 6 to produce on the screen 7 a colored luminous point having the same position, mean brightness and actual color as the point of the object 1 scanned at that instant in the transmitting station, so that the image of object 1 is reproduced on screen 7 both in shape and in colors.

In a first embodiment of my invention, the three characteristic elements A, B, C are: 1st— the mean brilliance of the colored point of the object which is scanned at the considered instant, that is: the signal which would be sent in an ordinary black and white television sytem; 2nd— the position in the visible spectrum of the radiation or wavelength which should be mainly absorbed in said visible spectrum in order to reproduce the actual color of said point; 3rd—the "degree of saturation" of the actual color of said point, that is: the proportion of white to be added to an appropriate monochromatic color (complementary to said most absorbed radiation) in order to reproduce said actual color of said point. The signal t corresponds to characteristic element A, whereas the characteristic elements B and C are combined in the coding device 3 in order to build the signal T.

In a second embodiment of my invention based on Maxwell's triangle of colors, the three characteristic elements A, B, C are: 1st—the mean brightness of said point, as above; 2nd—the "hue" or predominating monochromatic color corresponding to said point; 3rd—the "degree of saturation" of the actual color of said point.

In this case also the signal t corresponds to characteristic element A, whereas the characteristic elements B and C are combined in the coding device 3 in order to build the signal T.

The appended drawings illustrate examples of realisation of my invention, but any other form of realisation embodying other features well known in the television art should be considered as contained in the frame of my invention.

Figure 4 illustrates a first realisation of my invention in which the modulation of the color at the television receiving station utilizes the "chromatic polarisation" or the "dispersion of optical rotatory power for various wave lengths" associated with the Kerr effect electrically controlled, or with the electric accidental birefringence of a crystal, or with the Verdet effect magnetically controlled (magnetic optical rotation).

Figures 5 and 6 illustrate the transmitting television station in another embodiment of my invention, in which the spectral curve of the actual color of each point of the object to be shown at distance is automatically drawn, and in which the coding screen of Figure 7 is used.

Figure 9 illustrates the Maxwell's triangle of colors and Figure 10 a graphic construction in said triangle, whereas

I may also place the whole decoding device in the same vacuum tube (instead of three separate tubes $C'_i$ $C'_j$ $C'_r$) using "cylindrical electron optics."

Figures 4, 5, 14A, 14B, 14C, 15A, 15B, 15C, 15D, 15E:
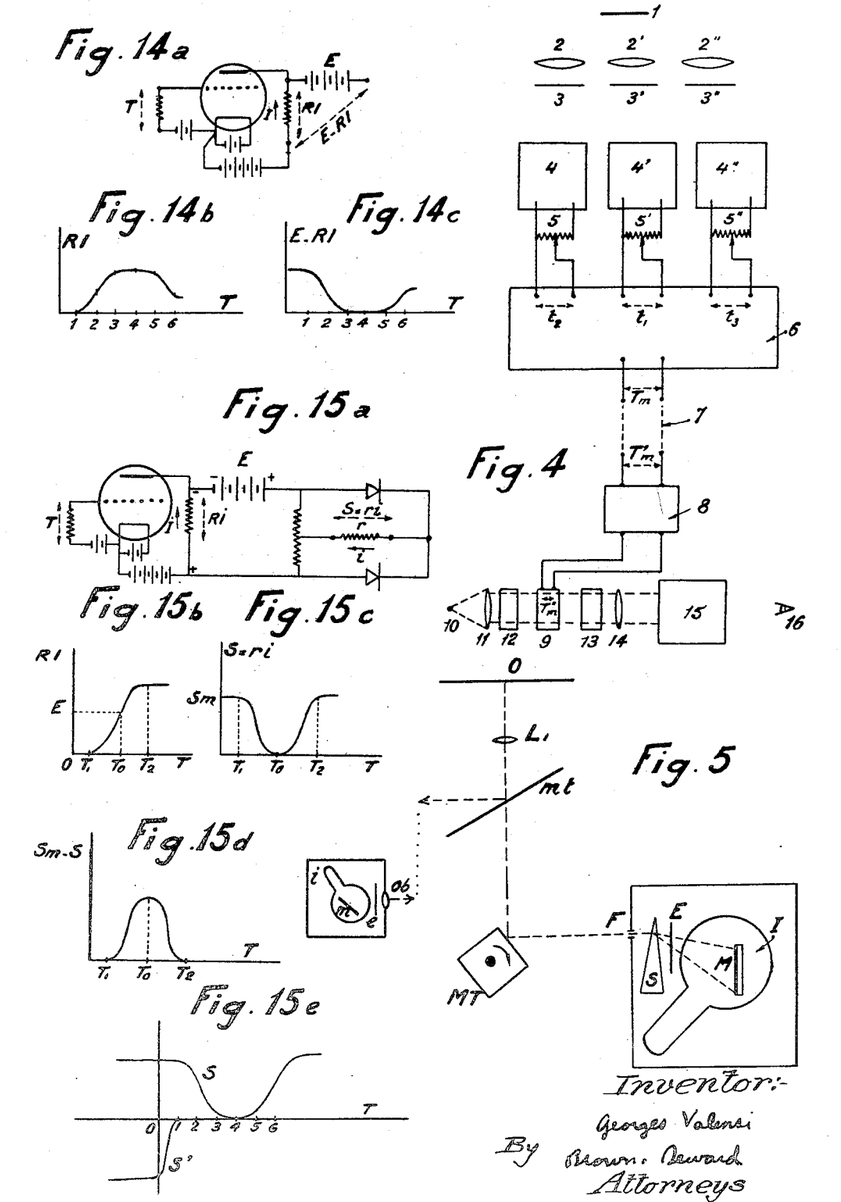

In Figure 4, the object to be shown at distance is represented in $1$. $4$, $4'$, $4''$ are devices scanning synchronously three images (of said object $1$) obtained through lenses $2$, $2'$, $2''$ and through a yellow screen $3$, a purple screen $3'$ and a green screen $3''$ respectively. At a given instant, electric voltages $t_1$, $t_2$, $t_3$, are obtained across the terminals of the output potentiometers $5'$ $5$ $5''$, which are proportional to the brightness values of the purple ($t_1$), yellow ($t_2$) and green ($t_3$) components of the actual color of the point of object $1$ being scanned at that instant. In this case the coding device $6$ is an "electrical differential arrangement" of three electrodes vacuum tubes combining these electric voltages $t_1$, $t_2$, $t_3$ together and producing a voltage $Tm$ which characterises the wave-length of the radiation which should be mainly absorbed in the visible spectrum in order to reproduce the actual color of said point of object $1$. This voltage $Tm$, transmitted over the metallic line or radiolink $7$ and amplified at the receiving station by amplifier $8$ produces a voltage $T''m$ across the terminals of the Kerr cell $9$.

The electrical differential arrangement $6$ is such: 1st—that $T''m$ has a value $T''mo$ corresponding to color No. 7 in the following table when $(t_1-t_2)$ and $(t_1-t_3)$ is positive, that is to say when the purple predominates in the actual color of said point of object $1$ which corresponds to a velocity difference of relative value O in the second column of said table; 2nd—that, when $(t_1-t_2)$ or $(t_1-t_3)$ is negative, $T''m$ differs from $T''mo$ and in fact is larger than $T''mo$ if $(t_3-t_2)$ is positive, and is smaller than $T''mo$ if $(t_3-t_2)$ is negative; 3rd—that the difference $(T''m-T''mo)$ in the latter cases increases in absolute value rapidly when $t_1$ is small and more slowly when $t_1$ is large (see the column "Relative value of velocity differences" in the following table) because the purple color corresponding to $T''mo$ is the most sensitive color in such optical phenomena.

Figures 4A, 11, 13:
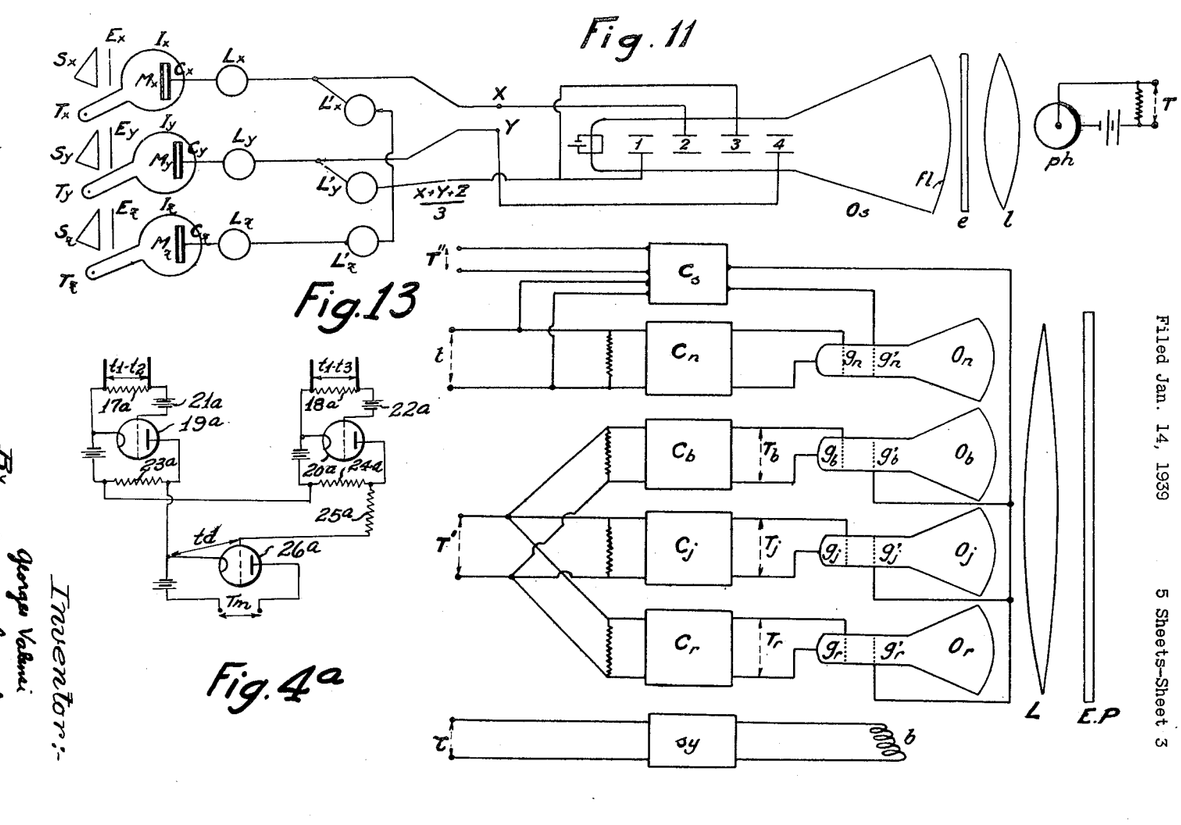
Figure 4a illustrates an electrical differential arrangement employed as an element of the embodiment of the invention illustrated in Fig. 4.
Figure 11 illustrates the transmitting station in the second embodiment of my invention which is based on said Maxwell's triangle and in which the coding screen shown in Figure 12 is used.
Figure 13 illustrates a television receiving station using cathode ray oscillographs and Figures 14 a, b, c and 15 a, b, c, d, e show the performance of the devices controlling said cathode ray oscillographs.

The specific apparatus comprising the coding device $6$ for obtaining this result is disclosed in my French application Serial No. 424,889, filed January 17, 1938, and which has since matured into French Patent No. 841,335, issued February 6, 1939. Referring to Fig. 4a, which is a substantial duplicate of the pertinent apparatus illustrated in Fig. 2 of my aforesaid French patent, the voltages $t_1$ and $t_2$ tapped from the potentiometers $5'$ and $5$ of Fig. 4, are opposed to each other, and the differential electric voltage $(t_1-t_2)$ appearing across the resistance $17a$ is applied to the grid of a first three electrode vacuum tube $19a$. Similarly, I oppose to each other the voltages $t_1$ and $t_3$ tapped from the potentiometers $5'$ and $5''$ of Fig. 4, and the differential electric voltage $(t_1-t_3)$ which appears across resistance $18a$ is applied to the grid of a second three electrode vacuum tube $20a$. The outputs of the tubes $19a$ and $20a$ appear as voltages across the resistances $23a$ and $24a$, respectively, and I oppose these voltages and apply the resultant differential voltage through resistance $25a$ across the grid circuit of a third vacuum tube $26a$ which is of the variable slope type. The output $Tm$ of the tube $26a$ is transmitted through the metallic line or radio link $7$ (see Fig. 4) and appears as a voltage $T''m$ at the input to the receiving station where it is amplified by the vacuum tube amplifier $8$ which produces a voltage $T''m$ applied to the Kerr cell $9$.

The Kerr cell $9$ is, for example, made of two metallic plates parallel to each other and immersed in nitrobenzene. It is well known that, when an electric voltage $T''m$ is applied between these metallic plates, the Kerr cell behaves like an uniaxial crystal (with its optical axis perpendicular to the plates) for the luminous rays passing through the nitrobenzene between the two metallic plates and consequently a velocity difference (dependent on the value of electric voltage $T''m$) is produced by the Kerr cell $9$ between the two rectilinear luminous vibrations transmitted without alteration.

The operation of the apparatus of Fig. 4a is as follows:

The grids of the tubes $19a$ and $20a$ are each biased to such a point on the tube characteristic that the voltage of the output of each tube remains substantially constant as long as $t_1-t_2$ or $t_1-t_3$ remains positive. As a result, the differential voltage $td$ obtained by opposing the voltages across the resistances $23a$ and $24a$ remains constant and substantially equal to zero when $t_1$ is greater than either $t_2$ or $t_3$. When voltage $td$ is applied to the grid of the tube $26a$, there is produced at the output terminals thereof a voltage which corresponds at the receiver to the purple tint if the constants of the circuits of tube $26a$ are properly adjusted.

If, on the other hand, one of the voltages $t_1-t_2$ or $t_1-t_3$ becomes negative, the differential voltage $td$ becomes either greater or smaller than when the purple tint was being televised. Thus if voltage $t_2$, representing yellow, is dominant and $t_1-t_2$ becomes negative, the voltage drop across resistance $17a$ reverses and the output of the tube $19a$ no longer remains constant but drops, causing a reduction in the voltage $t_d$ ($td=t_3-t_2$ which is negative under this condition) with a consequent reduction in the output voltage of the tube $26a$. The following table indicates that the Kerr cell $9$ will produce colors nearest the yellow end of the spectrum under this condition.

However, if voltage $t_3$, representing green, is dominant, $t_1-t_3$ becomes negative and the voltage $td$ increases ($t_3-t_2$ is positive under this condition) producing an increase in the output voltage of the tube 26a. As shown in the table, the Kerr cell 9 tends to produce colors nearest the green end of the spectrum under this condition. Thus, the apparatus illustrated in Fig. 4a is capable of operating as an "electrical differential arrangement" for the purpose of producing a definite output voltage $Tm$ for each color or combination of colors.

| N° of the color | Relative value of the velocity difference produced by the Kerr cell | Most absorbed radiation | Color obtained after analyser 13 |
| --- | --- | --- | --- |
| 1 | −259 | Indigo | Light yellow. |
| 2 | −233 | Blue | Bright yellow. |
| 3 | −135 | Blue (greenish) | Yellow (orange). |
| 4 | −60 | Green (bluish) | Orange (reddish). |
| 5 | −29 | Pale green | Red. |
| 6 | −14 | Green (yellowish) | Dark red. |
| 7 | 0 | Light green | Purple. |
| 8 | +10 | Yellow (greenish) | Violet. |
| 9 | +24 | Bright yellow | Indigo. |
| 10 | +99 | Orange | Blue. |
| 11 | +163 | Orange (brownish) | Blue (greenish). |
| 12 | +182 | Red (light carmine) | Green. |
| 13 | +261 | Purple | Light green. |

The Kerr cell 9 in the television receiving station acts as a "modulator of color." Inserted between polariser 12 (Glazebrook prism or the like) and analyser 13 (Glazebrook prism crossed with 12) on the path of the luminous rays produced by source of white light 10 between lenses 11 and 14, said Kerr cell 9 produces a velocity difference in the luminous rays and acts like a crystal plate, the thickness of which would vary in accordance with the electric voltage $T''_m$ applied between the electrodes of said Kerr cell 9. So the radiation most absorbed by said cell varies in accordance with column 3 of the above table when $T''_m$ varies in such a way that the velocity difference varies itself in accordance with column 2; consequently the color of the corresponding point of the image seen by eye 16 through the scanning device 15 varies in accordance with column 4 of the above table.

Instead of a Kerr cell, I may use, for the modulation of the color, a device utilising the electric or magnetic accidental birefringence of a crystal (quartz, Rochelle salt, etc.) or the magnetically controlled dispersion of the optical rotatory power (for various wave lengths) of a substance having a great Verdet effect (flint or silicoborate of sodium, carbon disulphide, arsenic trichloride, etc.).

Instead of using a purple screen 3', a yellow screen 3 and a green 3'', I may use screens of complementary colors (light green for 3', blue for 3 and red for 3''), the differential electrical arrangement 6 being then adjusted to produce an electric voltage $Tm$ indicating which is the smallest among the voltages $t_1$, $t_2$, $t_3$ at each instant.

Figures 6, 12:
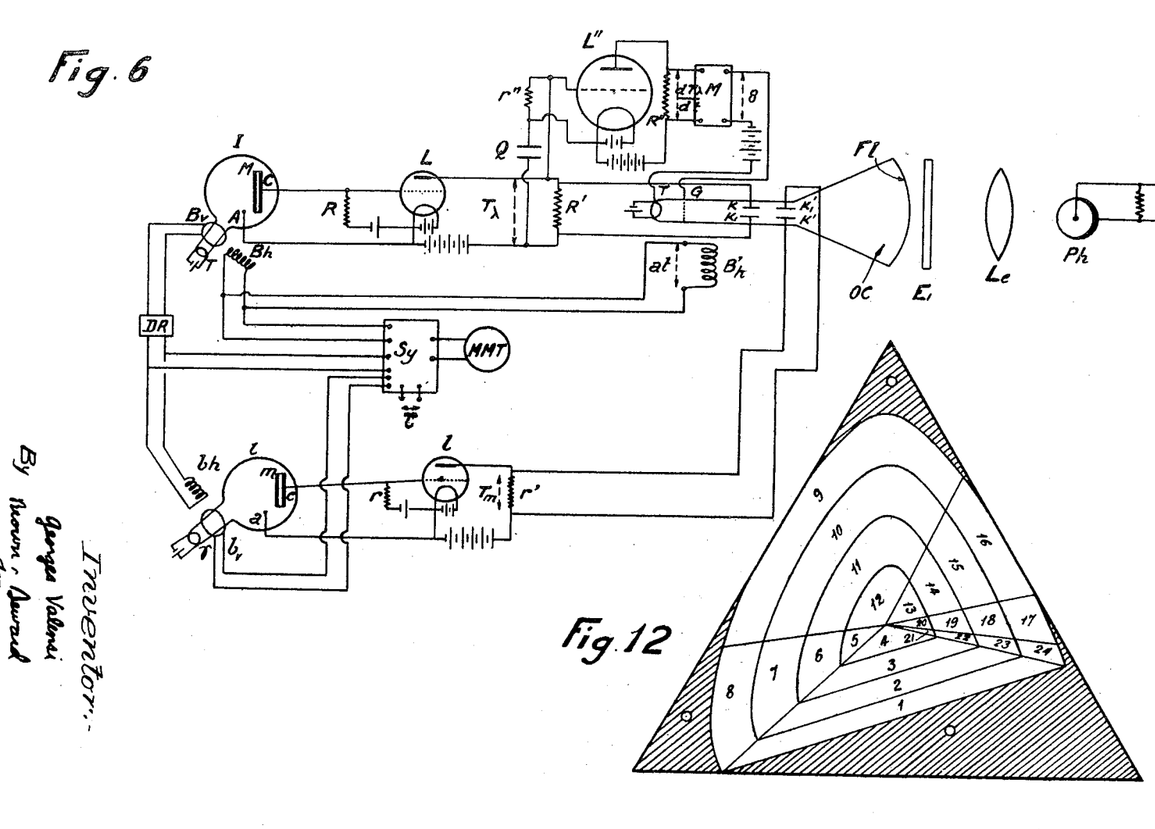

Figure 5 shows the optical arrangement and Figure 6 the electrical arrangement of the first embodiment of my invention, in which the spectral curve or diagram "energy-wave length" (Figure 8) of the actual color of each point of object O is automatically drawn on the fluorescent screen $Fl$ of the cathode-ray oscillograph OC within the coding device (Figure 6). The half transparent mirror $mt$ (Figure 5) associated with lens $L_1$ and objective $ob$ forms a first image of object O on the photosensitive mosaic $m$ of a first iconoscope $i$, through a colored screen $e$ which has a curve of chromatic sensitivity inverse to the curve of chromatic sensitivity of said mosaic $m$. Consequently the electric voltage obtained at the output of iconoscope $i$ (Figure 6), across the terminals of the output resistance $r'$ of the amplifying vacuum tube $l$, is proportional to the mean ordinate $Tm$ of the spectral curve of the color of the point P of object O being scanned at a given instant.

The half transparent mirror $mt$ (Figure 5) associated with the rotating prismatic mirror MT and the spectograph S (which slot is F) produces simultaneously on the photosensitive mosiac M of a second iconoscope I, the optical spectra of the colors of the various points of one line of object O, through a colored screen E which has a curve of chromatic sensitivity inverse to the curve of chromatic sensitivity of said mosaic M. Consequently the electric voltage obtained at the output of iconoscope I (Figure 6), across the terminals of the output resistance $R'$ of the amplifying vacuum tube L, is proportional to the various ordinates $T\lambda$ of the spectral curve of Figure 8 successively (energy $l\lambda$ corresponding to each wavelength $\lambda$ in the actual color of the point P of object O).

A synchronising device $Sy$ synchronises the motion of the electric motor MMT (Figure 6) which rotates the rotating mirror MT (Figure 5) with the deflection of the cathode ray in iconoscope $i$ (by means of deflecting coils $b_h$ for horizontal sweeping of mosaic $m$ and $b_v$ for vertical sweeping) and with the deflection of the cathode ray in iconoscope I (by means of deflecting coils $B_h$ for horizontal sweeping and $B_v$ for vertical sweeping of mosaic M). The horizontal sweeping of mosaic M being very rapid, I prefer to make it by means of a current in shape of double sawtooth (isocele triangle) produced by a symmetrical relaxation oscillator having a period equal to twice the duration of the scanning of one point of object O. A retarding device DR (loaded artificial line for example) introduces a delay (equal to the duration of the scanning of one point of object O) for the current producing the vertical sweeping of mosaic M referred to the current of same wave shape which produces the horizontal sweeping of mosaic $m$. Consequently during the interval of time required by the electric voltage across resistance $R'$ (Figure 6) to take successively the various values of $T\lambda$ (corresponding to the ordinates of spectral curve of the actual color of point P of object O), the electric voltage across resistance $r'$ keeps a constant value $Tm$ which is precisely the mean ordinate of said spectral curve corresponding to the same point P of object O.

Figure 8:
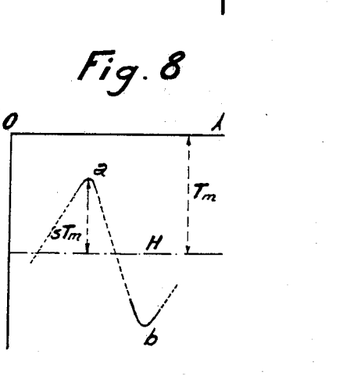
Figure 8 represents the spectral curve of the color of each picture point, as referred to in connection with Figs. 5 and 6.

The electric voltages $T\lambda$ and $Tm$ are applied in opposite directions to the deflecting plates $KK_1$ and $K'K'_1$ producing the vertical sweeping of the fluorescent screen $Fl$ of cathode ray oscillograph OC, whereas the horizontal sweeping of said screen $Fl$ produced by $B'_h$ is synchronised with the horizontal sweeping of mosaic M. Consequently the luminous spot would draw on the fluorescent screen $Fl$ a curve, the ordinates of which are proportional to the difference $(T\lambda - Tm)$ whereas the abscissae are proportional to the wave-length $\lambda$ (Figure 8). But the voltage $T\lambda$ is also applied to a condenser Q in series with a resistance $r''$, which is connected to the grid of a three electrode vacuum tube $L''$. Across the terminals of the output resistance R" of said tube L", I obtain a voltage equal to $$\frac{dT\lambda}{dt}$$

(t being time) which is applied to a controlling device M arranged in accordance with Figure 15a and having a performance characteristic of the type represented on Figure 15c (curve in shape of a "bell"); consequently when $$\frac{dT\lambda}{dt}$$

differs from zero, the voltage θ at the output of said controlling device M is always positive and, by means of the control grid G, suppresses the luminous spot on fluorescent screen Fl. On the contrary, when $$\frac{dT\lambda}{dt}=0$$

that is for the minima and the maxima of the spectral curve (Figure 8), the luminous spot appears in its full brightness; finally on the screen Fl, only the portions of said spectral curve represented in full line on Figure 8 appear luminous (that is only around the minimum a and the maximum b).

Figure 7:
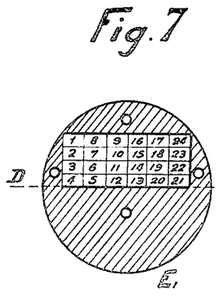
Figure 7a shows another coding screen for a simplified transmitting station on the principle illustrated by Figures 5 and 6.

In this form of my invention the actual color of the point P of object O being scanned is characterised by the wave-length corresponding to point a (most absorbed radiation) and by the "degree of saturation s" which is the ratio between the distance sTm of point a to the mean horizontal line H and the value Tm of the mean ordinate of the spectral curve (Figure 8). It is well known that, when the degree of saturation s decreases, that is to say when the proportion of white added to the monochromatic color (corresponding to the actual color of the considered point) increases, the minimum a of the spectral curve gets nearer to the mean horizontal line H. For that reason, I use in the coding device of Figure 6 the coding screen E₁ represented on Figure 7, which is completely opaque on all the hatched part marked O, and which is progressively more and more transparent from square No. 1 to square No. 24. In this case, the coding table is the following:

| Electric voltage T at the output of photoelectric cell Ph in the coding device | Most absorbed radiation | Color to be reproduced in the receiving television station | Degree of saturation s of said color |
|---|---|---|---|
| 0 | (All wave lengths equally absorbed.) | Black | |
| 1 | Violet | Yellow | 1.00 to 0.75 |
| 2 | do | do | 0.75 to 0.50 |
| 3 | do | do | 0.50 to 0.25 |
| 4 | do | do | 0.25 to 0 |
| 5 | Blue | Orange | 0 to 0.25 |
| 6 | do | do | 0.25 to 0.50 |
| 7 | do | do | 0.50 to 0.75 |
| 8 | do | do | 0.75 to 1.00 |
| 9 | Green | Red | 1.00 to 0.75 |
| 10 | do | do | 0.75 to 0.50 |
| 11 | do | do | 0.50 to 0.25 |
| 12 | do | do | 0.25 to 0 |
| 13 | Yellow | Violet | 0 to 0.25 |
| 14 | do | do | 0.25 to 0.50 |
| 15 | do | do | 0.50 to 0.75 |
| 16 | do | do | 0.75 to 1.00 |
| 17 | Orange | Blue | 1.00 to 0.75 |
| 18 | do | do | 0.75 to 0.50 |
| 19 | do | do | 0.50 to 0.25 |
| 20 | do | do | 0.25 to 0 |
| 21 | Red | Green | 0 to 0.25 |
| 22 | do | do | 0.25 to 0.50 |
| 23 | do | do | 0.50 to 0.75 |
| 24 | do | do | 0.75 to 1.00 |

The electric voltage T, obtained at the output of the photoelectric cell Ph (Figure 6) in which are concentrated the luminous rays produced by the portion a only of the spectral curve (Figure 8) on the fluorescent screen Fl (Figure 6) through the coding screen E₁ and the lens Le, constitutes the signal I' characterising the actual color of each point P of object O, and is sent on the line or radiolink towards the receiving station.

Another voltage t, obtained also at the transmitting station and proportional to the mean brilliancy of said point P of object O, is sent also towards the receiving station. This voltage t (characterising the brightness value of point P in an ordinary black and white image) may be obtained by another iconoscope (not shown on Figures 5 and 6) in the ordinary way. But I may also obtain this voltage t across the terminals of resistance r' (Figure 6) if the screen e, combined with the mosaic m of iconoscope i, reproduces the curve of chromatic sensitivity of the human eye; in such a case the voltage Tm (mean ordinate of the spectral curve "energy-wave length") is obtained, from the voltage t, by means of a three electrode vacuum tube inserted between r' and K'K'₁ (Figure 6), the grid of which is controlled by the voltage at (existing across the terminals of deflection coil B'h), said voltage at being modified by a controlling device such as the one of Figure 15a with a performance characteristic in shape of a bell, that is to say precisely the shape of the curve of chromatic sensitivity of the human eye.

Figure 7A:
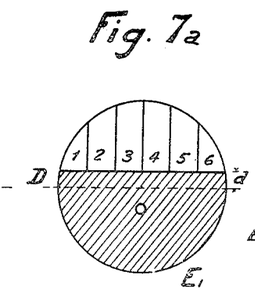

Instead of using on Figure 6 the coding screen E₁ represented on Figure 7, I may use the coding screen E₁ represented on Figure 7a, where the hatched portion marked O is black and completely opaque, whereas the portions marked 1 to 6 have an increasing transparence (from 1 to 6). The opaque portion O of screen E₁ (Figure 7a) covering a portion of fluorescent screen Fl up to a height d above the horizontal diameter D, if the complete spectral curve is drawn on the fluorescent screen Fl (omitting on Figure 6 the circuit elements marked Q, r", L", R", M, G), only the lower part of said spectral curve (corresponding to the most absorbed band of wave-lengths) will pass luminous rays through the coding screen, and the electric voltage T obtained at the output of photoelectric cell Ph will indicate then only the color (and not the degree of saturation), which may be sufficient as a first approximation.

Figure 9:
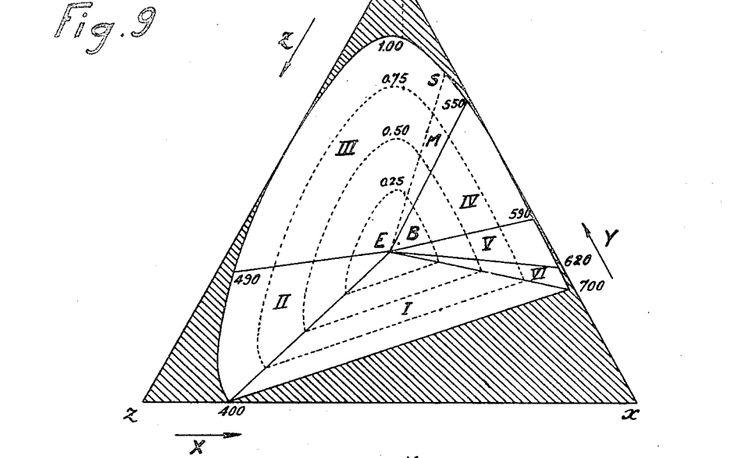

Figure 9 shows the Maxwell's triangle of colors in the form recommended by the International Illumination Commission in 1931. The position of point M, representing graphically a given color, is defined by three "trichromatic coordinates" taken along the X, Y and Z axes respectively in the direction of the arrow, with $$X+Y+Z=1$$

The center E of the triangle (located quite close to the point B representing the color white) corresponds to a "spectrum of equal energy" (hypothetic source radiating the same energy for each wave-length).

In terms of $e\lambda_n$ (proportion of energy per second for wave length $\lambda_n$), $\overline{x_n}$ $\overline{y_n}$ $\overline{z_n}$ (coefficients of distribution for stimuli of equal energy, or coordinates of the various points S on the curve representing the monochromatic colors inside the triangle of Figure 9), X, Y and Z are given by the following formulae:

$$X = \frac{\Sigma e_{\lambda_n} \overline{x_n}}{\Sigma e_{\lambda_n} \overline{x_n} + \Sigma e_{\lambda_n} \overline{y_n} + \Sigma e_{\lambda_n} \overline{z_n}}$$

$$Y = \frac{\Sigma e_{\lambda_n} \overline{y_n}}{\Sigma e_{\lambda_n} \overline{x_n} + \Sigma e_{\lambda_n} \overline{y_n} + \Sigma e_{\lambda_n} \overline{z_n}}$$

$$Z = \frac{\Sigma e_{\lambda_n} \overline{z_n}}{\Sigma e_{\lambda_n} \overline{x_n} + \Sigma e_{\lambda_n} \overline{y_n} + \Sigma e_{\lambda_n} \overline{z_n}}$$

The area of the triangle on Figure 9 has been subdivided in six segments I, II, III, IV, V, VI corresponding respectively to violet-purple, blue, yellow, green, orange and red. Also dotted curves have been drawn, parallel to curve S, and marked respectively 0,25—0,50—0,75.

The intersecting point S between the curve of monochromatic colors and the straight line EM (supposed in coincidence with the straight line BM) corresponds to the "hue" (or predominating wave-length in the spectrum of the actual color represented by point M); the ratio $$\frac{ME}{ES}$$

is equal to the "degree of saturation" of said actual color, that is the ratio between the brightness of the hue and the total brightness in said actual color.

Figure 10:
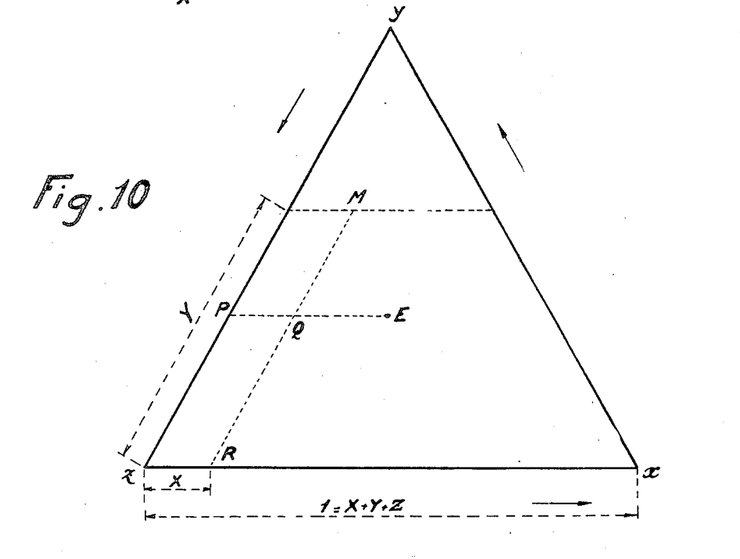

The graphical construction of Figure 10 shows that the point M might be obtained in starting from the center E of the triangle: 1st—by means of a first displacement EP, in the direction of the X axis, equal to $$-\frac{1}{3} = -\frac{X+Y+Z}{3}$$

followed by a second displacement PQ in the direction of said X axis, equal to X.

2nd—by means of a third displacement QR, in the direction of the Y axis, equal to $$\frac{1}{3} = \frac{X+Y+Z}{3}$$

followed by a fourth displacement RM in the direction of said Y axis, equal to $-Y$.

Advantage is taken of this remark in the second embodiment of my invention, utilizing the transmitting television station shown schematically on Figure 11 and the transparent coding screen of Figure 12.

The inconoscopes $Ix$ $Iy$ $Iz$ of Figure 11 have cathodes $Tx$ $Ty$ $Tz$ in form of wires emitting electrons and the photosensitive mosaics $Mx$ $My$ $Mz$ are swept vertically by rectilinear "electronic images" of said cathodes obtained by cylindrical "electron lens" not shown on the drawings.

An optical device (not shown completely on Figure 11) forms, on said mosaics $Mx$ $My$ $Mz$, through the prisms $Sx$ $Sy$ $Sz$ and the transparent screens $Ex$ $Ey$ $Ez$, the optical spectra of the actual colors of the various points of one line of the object O to be shown at distance (line being scanned at the given instant). The screen $Ex$ has parallel vertical lines black (opaque) or gray (half transparent) or white (completely transparent): the vertical line of $Ex$ corresponding to the vertical line of mosaic $Mx$ allocated to wavelength $\lambda_n$ has a transparence $$\delta_n = \frac{\overline{x_n}}{\delta_n}$$

($\overline{x}_n$ being the trichromatic coordinate X for monochromatic radiation of wave length $\lambda_n$ and $\delta_n$ being the chromatic sensitivity of mosaic $Mx$ for the wave length $\lambda_n$).

Similarly the screens $Ey$ and $Ez$ have vertical lines of transparences $$\frac{\overline{y_n}}{\delta_n} \text{ and } \frac{\overline{z_n}}{\delta_n}$$

in front of the vertical lines of mosaics $My$ and $Mz$ allocated to wave-length $\lambda_n$ ($\overline{y}_n$ and $\overline{z}_n$ having been defined hereabove and $\delta_n$ being the sensitivity of mosaic $My$ (or mosaic $Mz$) for wavelength $\lambda_n$).

Consequently the electric voltages X, Y, Z obtained at a given instant at the output of the amplifiers $Lx$ $Ly$ $Lz$, connected respectively to the collecting plates $Cx$ $Cy$ $Cz$ of iconoscopes $Ix$ $Iy$ $Iz$, are proportional to $$\Sigma e_{\lambda_n} \overline{x_n}, \Sigma e_{\lambda_n} \overline{y_n}, \Sigma e_{\lambda_n} \overline{z_n}$$

that is to say are proportional to the trichromatic coordinates of the point M representing in Maxwell's triangle the actual color of the particular point of the object O being scanned at that instant.

These electric voltages X, Y, Z are added together in the common output circuit of three-electrodes vacuum tubes $L'x$ $L'y$ $L'z$, in shunt with tubes $Lx$ $Ly$ $Lz$.

The electric voltages X, Y, Z and $$\frac{X+Y+Z}{3}$$

are applied to the deflecting plates 1, 2, 3, 4 of the cathode ray oscillograph $os$ of the coding device, as shown on Figure 11, in order to produce the four above mentioned displacements of the luminous spot on the fluorescent screen $fl$ of said oscillograph $os$ (plates 1 and 2 being perpendicular to the axis $zx$ of Maxwell's triangle and plates 3 and 4 being perpendicular to the axis $yz$ of said triangle). Consequently at a given instant the luminous spot of oscillograph $Os$ has in said Maxwell's triangle precisely the position M representing the actual color of the point of object O being scanned at that instant.

The coding transparent screen $e$ located in front of the fluorescent screen $fl$ is shown on Figure 12; the hatched portion marked O is black (completely opaque) and the other portions have a transparence which increases regularly from portion No. 1 to portion No. 24. In this case, the coding table is the following:

| Electric voltage T obtained at the output of the coding device, after photoelectric cell $ph$ | Hue, or predominating monochromatic color corresponding to the actual color of the point being scanned | Degree of saturation of said actual color |
|---|---|---|
| 0 | Black | |
| 1 | Violet | 1.00 to 0.75 |
| 2 | ----do---- | 0.75 to 0.50 |
| 3 | ----do---- | 0.50 to 0.25 |
| 4 | ----do---- | 0.25 to 0 |
| 5 | Blue | 0 to 0.25 |
| 6 | ----do---- | 0.25 to 0.50 |
| 7 | ----do---- | 0.50 to 0.75 |
| 8 | ----do---- | 0.75 to 1.00 |
| 9 | Green | 1.00 to 1.75 |
| 10 | ----do---- | 0.75 to 0.50 |
| 11 | ----do---- | 0.50 to 0.25 |
| 12 | ----do---- | 0.25 to 0 |
| 13 | Yellow | 0 to 0.25 |
| 14 | ----do---- | 0.25 to 0.50 |
| 15 | ----do---- | 0.50 to 0.75 |
| 16 | ----do---- | 0.75 to 1.00 |
| 17 | Orange | 1.00 to 0.75 |
| 18 | ----do---- | 0.75 to 0.50 |
| 19 | ----do---- | 0.50 to 0.25 |
| 20 | ----do---- | 0.25 to 0 |
| 21 | Red | 0 to 0.25 |
| 22 | ----do---- | 0.25 to 0.50 |
| 23 | ----do---- | 0.50 to 0.75 |
| 24 | ----do---- | 0.75 to 1.00 |

The electric voltage T, obtained at the output of the coding device after the photoelectric cell ph, in which are concentrated the luminous rays produced by the luminous spot on the fluorescent screen fl through the coding screen e, constitutes the signal I' characterising the actual color of each point of object O, and is sent on the metallic line or radiolink towards the television receiving station.

Another voltage t, obtained also at the transmitting station and proportional to the mean brilliancy of each point of object O, is sent also towards the television receiving station. This voltage t (characterising the brightness value of a given point in an ordinary black and white image) may be obtained by another iconoscope (not shown on Figure 11) in the ordinary way. But I may also obtain this voltage t in adding three voltages equal to $g_xX$, $g_yY$, $g_zZ$ produced at the output of three vacuum tubes $L''_x$ $L''_y$ $L''_z$ (not shown on the drawings but supposed connected in shunt to tubes $L_x$ $L_y$ $L_z$ and tubes $L'_x$ $L'_y$ $L'_z$); the gains $g_x$, $g_y$, $g_z$ produced by said amplifying tubes $L''_x$ $L''_y$ $L''_z$ should take into account the shape of the chromatic sensitivity of the human eye, so that the sum $t = g_xX + g_yY + g_zZ$ represents the mean brightness of the point of the object, whereas X, Y and Z are energies.

I prefer to use two channels on the metallic line or radiolink between the transmitting and receiving television stations, in order to transmit separately the signal or voltage T characterising the color and the signal or voltage t characterising the mean brightness.

Figure 13 represents a form of realisation of the receiving television station corresponding either to the transmitting television station shown on Figure 6 (first embodiment of my invention) or to the transmitting television station shown on Figure 11 (second embodiment of my invention).

Figure 2:
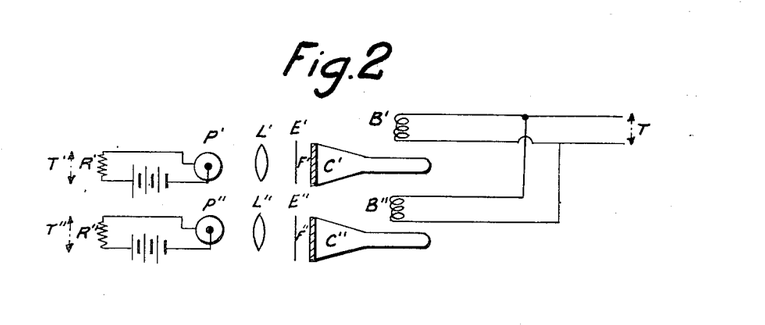
Figs. 2, 3a and 3b illustrate the decoding device 5 of Fig. 1 in a television receiving station in accordance with Fig. 13.
Figure 3A:
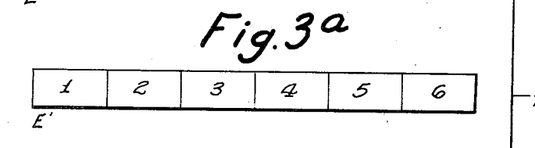
Figure 3B:
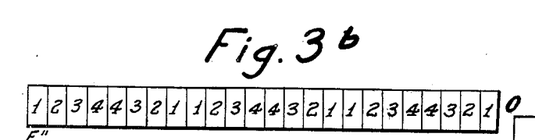

Let us assume that a decoding device of the type shown on Fig. 2 (device not reproduced on Fig. 13) has discriminated in the signal T (proceeding from the distant transmitting television station); 1st, an electric voltage T' characterizing the color (either the most absorbed radiation, or the "hue"=predominating radiation), and 2d, an electric voltage T" characterising the "degree of saturation." This decoding device shown on Fig. 2, comprises two cathode ray oscillographs C' and C", with fluorescent screens F' and F" in front of which are decoding screens E' and E" respectively. The electric signal T, received from the distant transmitting station (where either the coding screen of Fig. 7 or the coding screen of Fig. 12 is supposed to be used) is applied simultaneously to the deflecting coils B' and B", so that the luminous spots on fluorescent screens F' and F" move along horizontal diameters of said fluorescent screens, the amplitude of this motion being proportional to the value of T. The decoding screen E' presents along said horizontal diameter of F' 6 rectangles numbered I to 6 on Fig. 3a, and having increasing transparence (I being for example completely opaque whereas 6 is completely transparent). The decoding screen E" presents along said horizontal diameter of F" 24 squares (corresponding to the 24 squares of Fig. 7 or to the 24 portions of Fig. 12) the squares numbered I on Fig. 3b are for example completely opaque whereas those numbered 4 are completely transparent—the transparences of squares 2 and 3 having intermediate values. The lenses L' and L" condense the luminous rays passing through screens E' and E" in the photoelectric cells P' and P" respectively. Referring to Figs. 3a, 3b on one hand, and either Fig. 7 or Fig. 12 on the other hand, it is immediately apparent the electric voltage T' obtained across the terminals of resistance R' (Fig. 2) characterises the color whereas the electric voltage obtained across the terminals of resistance R" (Fig. 2) characterises the "degree of saturation."

In the decoding device shown in Fig. 2, I may also place the photoelectric cell P' and the screen E' within the cathode ray tube C', on the same mounting that the fluorescent screen F'; and I may do the same for P" E" F" C".

Instead of using photoelectric cells in this decoding device of Fig. 2, I may utilize an emission of secondary electrons and so avoid the intermediate transformation in light; in such a case the screens E' and E" are mosaics of juxtaposed elements of emitting and nonemitting materials, swept by the beam of cathode rays which produces a more or less intense flux of secondary electrons, said electrons being concentrated by appropriate "electrons optics" on a collecting electrode connected to the output resistance (R' or R").

I may also place the whole decoding device in the same vacuum tube (instead of two separate tubes C' and C") using cylindrical "electrons optics."

In the decoding device of Fig. 2, I may also replace the part C" E" L" P" R" by a differential arrangement of three electrode vacuum tubes producing the electric voltage T" as a difference between T (received from the transmitting station) and T' (generated across the terminals of R', as shown in Fig. 2).

Finally I may use for the decoding device, instead of the arrangement shown on Fig. 2, a cathode ray commutator having a number of target electrodes connected to different points of a scale of potentials in accordance with the coding screen adopted (Fig. 7 or Fig. 12). The cathode rays beam, under the action of a deflecting coil (or deflecting plates) energized by the controlling voltage T applied to the input terminals of said decoding device impinges upon the proper target electrode, and consequently applies the proper electric voltage T" to the output terminals of said decoding device.

Referring again to Fig. 13, the electric voltage T' characterising the color is applied to the input terminals of the devices $C_r$, $C_j$, $C_r$ which control respectively the brightness of the cathode ray oscillographs $O_b$, $O_j$, $O_r$ (producing respectively a blue image, a yellow image and a red image), by means of the control grids $g_b$, $g_j$ and $g_r$ respectively.

Simultaneously the electric voltage t (characterising the mean brightness) is applied to the input terminals of device $C_n$ controlling the brightness of the cathode ray oscillograph $O_n$ (producing a black and white image), by means of the control grid $g_n$.

The electric voltages t (mean brightness) and T" (degree of saturation) are applied to the input terminals of device $C_s$ which controls the proportion of white light and of colored light which are mixed on the projection screen EP, in order to reproduce the appropriate "degree of saturation," this control being made by means of the auxiliary control grids $g'_n$, $g'_b$, $g'_j$ and $g'_r$.

The deflections of the cathode rays in oscillographs $O_n$, $O_b$, $O_j$, $O_r$ are simultaneously produced by a device sy (with deflecting coils b)

which is synchronised by the synchronising impulses $r$ transmitted by the corresponding television transmitting station; consequently at a given instant the 4 luminous spots on the fluorescent screens of oscillographs $O_n$, $O_b$, $O_j$, $O_r$ have the same geometrical position in the image (black, blue, yellow, or red); an optical system represented schematically by lens L, concentrates and superposes the luminous rays emitted by said 4 luminous spots on the same point of the projection screen E P. Oscillograph $O_n$ draws on screen EP the shape (in black and white) of the object O to be seen at distance, whereas the oscillographs $O_b$, $O_j$, $O_r$ add to this drawing "colored touches," the control grids $g_b$ $g_j$ $g_r$ determining the color of said colored touches and the auxiliary control grids $g'n$ $g'b$ $g'j$ $g'r$ determining the degree of saturation of said colored touches.

Let us consider for example the coding table given hereabove and corresponding to the transmitting television station of Figure 6 (first embodiment of my invention). To conform to this coding table, the controlling devices $C_b$ $C_j$ $C_r$ must produce at their output terminals the following electric voltages $T_b$ $T_j$ $T_r$ respectively applied to the control grids $g_b$ $g_j$ $g_r$ when the voltage T is applied to their input terminals.

For the devices $C_b$ and $C_r$ producing the voltages $T_b$ (control of the blue component) and $T_r$ (control of the red component), an arrangement such as Figure 14a or 15a with a performance characteristic such as Figure 14b or Figure 15d is used according to the above table; for the device $C_j$ producing the voltage $T_j$ (control of the yellow component), I associate a device shown on Figure 15a having the performance characteristic S of Figure 15c with a pentode having the performance characteristic S' of Figure 15e, in order to obtain a value $T_j=0$ when $T=0$ (black color), in accordance with the above table.

In the case of the other coding table given above and corresponding to the transmitting television station of Figure 11 (second embodiment of my invention), the controlling devices $C_b$ $C_j$ $C_r$ would be arranged to respond to the "hue" [predominating radiation (or wave-length)] and not to the "most absorbed radiation" (or wave length), but they would also be made on the principles of Figure 14a or Figure 15a.

Although in the above described television stations cathode ray devices have been shown exclusively (iconoscopes for the transmission and oscillographs with fluorescent screens for the reception of television), the invention applies just as well to color television installations using elec-

| Value of the electric voltage T received from transmitting station (modulation of color) | 0 | 1 to 4 | 5 to 8 | 9 to 12 | 13 to 16 | 17 to 20 | 21 to 24 |
|---|---|---|---|---|---|---|---|
| Most absorbed radiation | All wave lengths equally absorbed. | Violet | Blue | Green | Yellow | Orange | Red. |
| Voltage $T_b$ controlling the blue component | 0 | 0 | 0 | 0 | 1 | 2 | 1. |
| Voltage $T_j$ controlling the yellow component | 0 | 2 | 1 | 0 | 0 | 0 | 1. |
| Voltage $T_r$ controlling the red component | 0 | 0 | 1 | 2 | 1 | 0 | 0. |
| Hue, or predominating monochromatic color corresponding to the actual color obtained on the projection screen at the receiving station. | Black | Yellow | Orange | Red | Violet | Blue | Green. |

The above table shows that, when voltage T increases regularly from 1 to 24, each voltage $T_b$ $T_j$ or $T_r$ should vary according to a law represented graphically by a curve in shape of a "bell" (like Figure 14b or Figure 15d) or of an "inverted bell" (like Figure 14c or Figure 15c), the top (or the bottom) of said "bell" being conveniently located along the T axis.

Devices having such a performance characteristic are shown, as examples, on Figures 14a and 15a.

Figure 14a represents a three-electrodes vacuum tube, the grid of which is polarised in such a way that the curve giving the output voltage RI in terms of the input voltage T has the shape shown on Figure 14b (dynatron effect). By means of a battery E (Figure 14a), the other shape of curve shown on Figure 14c (E—RI in terms of T) may be readily obtained.

Figure 15a represents a three-electrode vacuum tube having the characteristic (RI in terms of T) shown on Figure 15b. At the output of said tube is connected a Wheatstone bridge, two arms of which are high resistances of equal values, whereas the two other arms are copper-oxide rectifiers. Across the terminals of the resistance $r$, in the diagonal of said Wheatstone bridge, I have a uni-directional current, the intensity $i$ of which is equal to zero when $T=T_0$ and rises always when T becomes larger or smaller than $T_0$; the maximum $S_m$ of the voltage $S=ri$ is obtained for $T=T_1$ or $T=T_2$; consequently the performance characteristic of such a device shown on Figure 15a has either the shape of the curve of Figure 15c (S in terms of T) or of the curve of Figure 15d ($S_m-S$ in terms of T).

tromechanical scanning devices and any type of source of colored light such as (1) ionic relays constituted by luminescent electrical discharge valves (gas or vapor) whose brilliance is controlled by means of a modulating electrode (2) incandescent lamps fitted with devices for modulating color and brilliance, calling into play either chromatic polarisation with electric or magnetic double refraction (Kerr effect, accidental electrical double refraction of a piezo-electric crystal, etc.) or rotary magnetic dispersion, or any other known electro-optical or magneto-optical phenomenon.

I claim:

1. System for color television comprising, scanning means for exploring successively elemental areas of the object to be shown at distance, means for producing a first electric signal $t$ corresponding to the brightness of one elemental area at each given instant, means for analyzing automatically the color of said elemental area at said instant, means for producing an electrical response representative of said color, a coding device for deriving automatically from said electrical response a single second electric signal T corresponding in a predetermined code to the color of said elemental area, electrical means for transmitting directly said first and second electric signals to a distant station, sources of light at said distant station, means for modulating said light with said received signals, and a scanning and optical device for combining said modulated beams of light to recompose the image substantially in the original colors of said object.

2. System for color television comprising, scanning means for exploring successively elemental areas of the object to be shown at distance, means for producing a first electric signal $t$ corresponding to the brightness of one elemental area at each given instant, means for analyzing automatically the color of said elemental area at said instant and for selecting three basic components of said color, means for producing simultaneously electrical responses representative of said components, a coding device for deriving automatically from said electrical responses a single second electric signal T corresponding in a pre-determined code to the color of said elemental area, electrical means for transmitting directly said first and second electric signals to a distant station, sources of light at said distant station, means for modulating said light with said received signals, and a scanning and optical device for combining said modulated beams of light to recompose the image substantially in the original colors of said object.

3. System for color television according to claim 2 in which the color analyzing means includes three colored screens associated with the scanning means.

4. System for color television according to claim 2 in which the coding device includes a differential arrangement of thermionic tubes.

5. System for color television according to claim 2 in which the color analyzing means includes three colored screens associated with the scanning means, and in which the coding device includes a differential arrangement of thermionic tubes.

6. Color television system according to claim 1 in which the color analyzing means is adapted to draw automatically the spectral curve of the actual color of one elemental area at a given instant, and in which the coding device is adapted to derive the signal T from said spectral curve.

7. Color television system according to claim 1 in which the color analyzing means is adapted to locate automatically in a Maxwell's color triangle the luminous point which represents the actual color of one elemental area at a given instant, and in which the coding device is adapted to derive the signal T from the position of said luminous point.

8. System for color television of high definition comprising in combination scanning means for exploring successively elemental areas of the object to be shown at distance, means for producing a first electric signal $t$ corresponding to the brightness of one elemental area at each given instant, means for analysing automatically the color of said elemental area, a coding device for deriving automatically from said analysis a single second electric signal T corresponding in a predetermined code to the color of said elemental area, electrical means for transmitting directly said first and second electric signals to the distant station, sources of light at said distant station, means for modulating said light with said first and second electric signals, a scanning device, a projection screen, and an optical device for superposing on said screen the luminous beams emitted by said sources, whereby colored touches are added to the black, grey and white picture of the televised object.

9. A system for color television of high definition comprising scanning means for exploring successively elemental areas of the object to be shown at distance, means for producing a first electric signal $t$ corresponding to the brightness of one elemental area at each given instant, means for producing a second electric signal T corresponding in a predetermined code to the color of said elemental area, electrical means for transmitting said first and seconds signals $t$ and T to the distant station, a decoding device at said distant station driving from said second signal T one voltage T' corresponding to the predominating radiation in the color of said elemental area and another voltage T'' corresponding to the degree of saturation of said color, a cathode ray oscillograph with a white fluorescent screen, means for acting on the intensity of said cathode rays in accordance with the values of $t$ and T'' whereby the picture in black, grey and white is reproduced on said fluorescent screen, three cathode rays oscillographs having respectively a blue, a yellow and a red fluorescent screen, means for acting on the intensity of the cathode rays of said oscillographs in accordance with the value of T', a projection screen, and an optical device superposing on said projection screen, the luminous beams emitted by said white fluorescent screen and by said blue, yellow and red fluorescent screens, whereby colored touches are added to the black, grey and white picture of the televised object.

10. A system for color television of high definition in accordance with claim 1 in which the means for modulating light at the receiving station comprise an electro-optical device arranged in a beam of white light between a polarizer and an analyser and producing double refraction under the action of the electric signal T proceeding from the transmitting station, whereby the color of the light after said analyser changes in accordance with the value of T.

11. A system for color television of high definition in accordance with claim 1 in which the means for modulating light at the receiving station comprise a magneto-optical device with a substance having a high Verdet constant and arranged in a beam of white light between a polarizer and an analyser, and producing a rotary magnetic polarizing effect under the action of the electric signal T proceeding from the transmitting station, whereby the color of the light after said analyser changes in accordance with the value of T.

12. A system for color television of high definition in accordance with claim 1 in which the means for modulating light at the receiving station comprise four luminescent electric discharge valves containing a gas or vapour having respectively a white, a blue, a yellow and a red color of luminescence, the brightness of said luminescence being controlled by a modulating electrode under the action of the electric signal, $t$ for the white luminescence and T for the colored luminescences, proceeding from the transmitting station.

13. A system according to claim 9 in which the decoding device is a cathode ray tube having a plurality of target electrodes connected to different points in a source of potential supply and to a load impedance, the tapping points in said source of supply to which the target electrodes are connected representing "degrees of saturation" T'', and the coded signal T corresponding to the color of one elemental area of the picture acting upon the cathode rays beam in such a manner that said beam is caused to impinge upon one or another of said target electrodes.

14. A system according to claim 9 in which the decoding device comprises two cathode ray oscillographs with fluorescent screens, two decoding screens, located in front of said fluorescent screens, in which screens the various parts are more or less transparent according to the signalling code employed, and two photoelectric cells acted upon by the luminous rays emitted by said fluorescent screens through said transparent decoding screens, the coded signal T, corresponding to the color of one elemental area of the picture, acting upon the cathode rays beams in such a manner that the output T' of the first photoelectric cell corresponds to the predominating radiation in the color of said elemental area whereas the output T'' of the second photoelectric cell corresponds to the "degree of saturation" of said color.

15. A system according to claim 9 in which the decoding device comprises two cathode ray tubes, each having a decoding electrode formed by juxtaposed elements of substances with different powers of secondary electron emission, said juxtaposition corresponding to the signalling code employed, the coded signal T, which corresponds to the color of one elemental area of the picture, acting upon the cathode rays beams in such a manner that the output T' of the first cathode ray tube corresponds to the predominating radiation in the color of said elemental area whereas the output T'' of the second cathode ray tube corresponds to the "degree of saturation" of said color.

GEORGES VALENSI.